United States Patent
Kernan

(10) Patent No.: US 7,069,839 B2
(45) Date of Patent: Jul. 4, 2006

(54) FLIP RAMP MECHANICAL INTERLOCK FOR APPLIANCE

(75) Inventor: Colin Michael Kernan, Stamford, CT (US)

(73) Assignee: Conair Corporation, Stamford, CT (US)

( * ) Notice: Subject to any disclaimer, the term of this patent is extended or adjusted under 35 U.S.C. 154(b) by 0 days.

(21) Appl. No.: 11/045,426

(22) Filed: Jan. 28, 2005

(65) Prior Publication Data

US 2005/0284308 A1   Dec. 29, 2005

Related U.S. Application Data

(63) Continuation of application No. 10/878,245, filed on Jun. 28, 2004, now Pat. No. 6,907,819.

(60) Provisional application No. 60/483,934, filed on Jul. 1, 2003.

(51) Int. Cl.
*B02C 18/16* (2006.01)

(52) U.S. Cl. .............................. 99/337; 99/492; 99/510; 241/37.5; 241/92

(58) Field of Classification Search .................. 99/337, 99/492, 510, 348, 511; 241/36, 37.5, 92; 366/205, 601
See application file for complete search history.

(56) References Cited

U.S. PATENT DOCUMENTS

| | | | |
|---|---|---|---|
| 3,892,365 A | 7/1975 | Vendun | |
| 4,216,917 A * | 8/1980 | Clare et al. ................ | 241/37.5 |
| 4,226,373 A | 10/1980 | Williams | |
| 4,321,741 A | 3/1982 | Williams | |
| 4,371,118 A | 2/1983 | Sontheimer | |
| 4,396,159 A | 8/1983 | Podell | |
| 4,471,915 A | 9/1984 | Levin et al. | |
| 4,506,836 A | 3/1985 | Williams | |
| 4,512,522 A | 4/1985 | Williams | |
| 4,523,470 A | 6/1985 | Müller et al. | |
| 4,540,128 A | 9/1985 | Breeden | |
| 4,544,103 A | 10/1985 | Breeden | |
| 4,614,306 A | 9/1986 | Doggett | |
| 4,623,097 A | 11/1986 | Sontheimer | |
| 4,629,131 A | 12/1986 | Podell | |
| 4,674,690 A | 6/1987 | Ponikwia et al. | |
| 4,706,896 A | 11/1987 | Moon-Kau | |
| 4,741,482 A | 5/1988 | Coggiola et al. | |
| 4,799,626 A | 1/1989 | Hickel et al. | |
| 4,819,882 A | 4/1989 | Stottmann et al. | |
| 4,821,968 A | 4/1989 | Fleche | |
| 4,824,029 A | 4/1989 | Stottmann et al. | |
| 5,037,033 A | 8/1991 | Stottmann et al. | |
| 5,445,070 A | 8/1995 | Rebel | |

(Continued)

FOREIGN PATENT DOCUMENTS

CA    1 133 802    10/1982

(Continued)

*Primary Examiner*—Reginald L. Alexander
(74) *Attorney, Agent, or Firm*—Lawrence Cruz; Steven A. Garner

(57) ABSTRACT

A locking system for an appliance has lid and feed chute locking components that include a spring-biased, ramp surfaced pivoting arm that is adapted to be activated to extend or retract a rod that activates or de-activates a motor drive of a food processor. The arm is activated by rotational movement of the lid relative to the bowl, as an extension member attached to the lid, which is activated by insertion of the plunger, extends downwardly from the lid and engages the ramp surface of the pivoting arm when the lid is rotated. Thus, the plunger can remain inside of the food chute of the lid while the lid is removed or replaced.

8 Claims, 9 Drawing Sheets

U.S. PATENT DOCUMENTS

| | | |
|---|---|---|
| 5,454,299 A | 10/1995 | Gonneaud |
| 5,486,665 A | 1/1996 | Le Rouzic |
| 5,544,573 A | 8/1996 | Gateaud |
| 5,655,649 A | 8/1997 | Lazzer |
| 5,979,806 A | 11/1999 | Borger et al. |
| 6,340,124 B1 | 1/2002 | Charles et al. |
| 6,375,102 B1 | 4/2002 | Bouleau et al. |
| 6,474,578 B1 | 11/2002 | Gonneaud et al. |
| 6,510,784 B1 | 1/2003 | Fevre et al. |
| 6,568,843 B1 | 5/2003 | Lai |
| 6,640,694 B1 | 11/2003 | Brezovnik et al. |
| 6,669,124 B1 | 12/2003 | Lazzer et al. |
| 6,776,086 B1 | 8/2004 | Chang Chien |
| 6,814,323 B1 | 11/2004 | Starr et al. |
| 2002/0046660 A1 | 4/2002 | Obersteiner |
| 2003/0010222 A1 | 1/2003 | Fevre et al. |
| 2003/0205635 A1 | 11/2003 | Lazzen et al. |
| 2004/0251342 A1* | 12/2004 | Wanat ............ 241/37.5 |
| 2005/0000370 A1 | 1/2005 | Kernan |

FOREIGN PATENT DOCUMENTS

| | | |
|---|---|---|
| DE | 102 19 763 | 11/2002 |
| GB | 2 375 036 | 6/2002 |

* cited by examiner

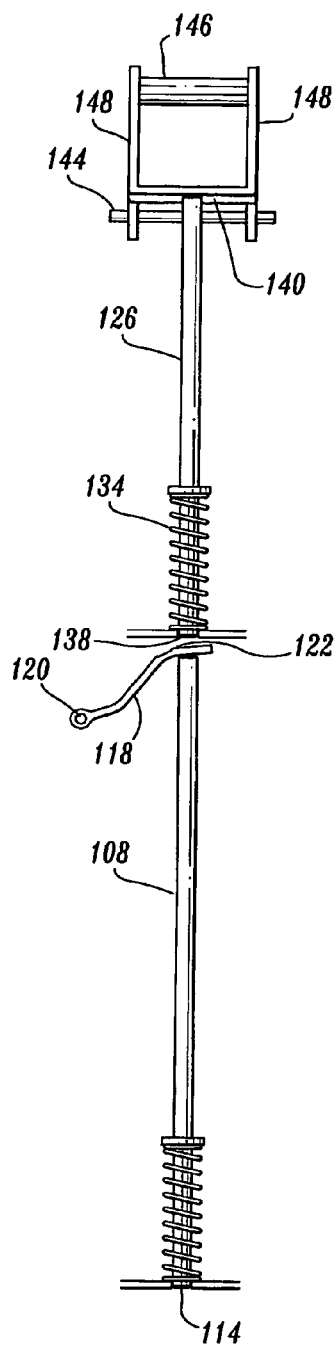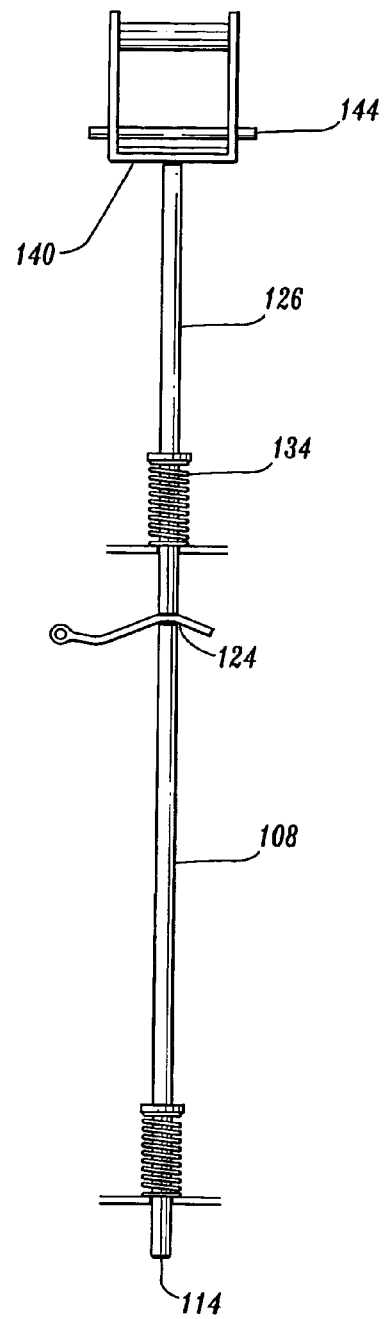
FIG. 4A  FIG. 4B

FLIP RAMP MECHANICAL INTERLOCK FOR APPLIANCE

CROSS-REFERENCE TO RELATED APPLICATIONS

This application is a continuation application and claims priority to provisional application No. 60/483,934 filed Jul. 1, 2003 and U.S. application Ser. No. 10/878,245 filed Jun. 28, 2004, now U.S. Pat. No. 6,907,819, the entire disclosures of which are hereby incorporated by reference.

BACKGROUND OF THE INVENTION

1. Field of the Invention

The present invention relates to appliances such as food appliances and, more particularly, to appliances in which a mechanical lock is used to prevent activation of a motor or drive until a physical condition is satisfied such as when a cover is securely fastened on a food processor.

2. Description of Related Art

It is known in the art to provide mechanical activations means in various forms that activate a drive or motor when a device is in a condition such as a locked position for safety or proper function. Such devices are in a disabled mode when the condition is not met, such as when a lock or cover is not in place.

Specifically with respect to food processors, such as the one schematically shown in FIGS. 1–2. As shown in the exploded diagram of FIG. 1, a food processor base (10) has contained therein a motor and drive means (not shown) to engage and drive a blade shaft and blade (not shown) within a cylindrically shaped bowl (12) for chopping or mixing food. The motor or drive is rendered operable, or activated, only when a switch (14) is activated. A first rod (16) is located within a hollow channel (18) adjacent to a handle (20) outside of the bowl (12). The first rod (16) is biased by a spring (22) that engages a first flange (24) fixed to the rod (16). A second flange (26) is located at the top of the rod (16). Referring to FIG. 2, the first rod (16) is moved against the spring (22) by a downward force directed from a second rod (30) that is fixed to a plunger (28), when the plunger (28) is pushed into a food chute (32) which is integrally formed with a round lid (34) that covers the bowl (12). A channel (36) is provided for the second rod (30) to pass through. When the first rod (16) is moved as shown in FIG. 2, its lower end engages the switch (14) to activate the motor or drive in the base (10).

A problem associated with a design such as that described in FIGS. 1–2, is that when the second rod (30) is engaged as shown in FIG. 2, it is not possible to remove the lid (34) from the bowl (12), since the lid (34) locks relative to the bowl (12) by a relative rotational motion about axis Z in order to engage ramp wedges or bayonet lock features (not shown) commonly used on food processor lids. Thus, attempting to unlock the lid (34) from the bowl (12) by relative rotation would be prevented because the second rod (30) extends between the two and acts like a deadbolt or sliding lock. When it is desired to remove the lid (34) to access the inside of the bowl (12), therefore, it is necessary to first remove the plunger (28) from the food chute (32) to that the second rod (30) no longer impedes the rotational movement of the lid (34) relative to the bowl (12). This is cumbersome and may create a mess in the working space since food particles may be attached to the plunger (28). This problem is associated with known food processors of the type having a wide mouth feed chute, since these are designed to be disabled when the plunger is not inside the feed chute as a safety measure.

It is desirable, therefore, to provide a superior mechanical system for enabling and disabling a motor or drive in a food processor of the type having a wide mouth feed chute that facilitates removal of a lid from a bowl without the need to first remove the plunger.

These and other objects are achieved by the present invention described herein.

BRIEF SUMMARY OF THE INVENTION

The present invention locking system for an appliance is directed to lid and feed chute locking components that include a spring-biased, ramp surfaced pivoting arm that is adapted to be activated to extend or retract a rod that activates or de-activates a motor drive of a food processor. The arm is activated by rotational movement of the lid relative to the bowl, as an extension member attached to the lid, which is activated by insertion of the plunger, extends downwardly from the lid and engages the ramp surface of the pivoting arm when the lid is rotated. Thus, the plunger can remain inside of the food chute of the lid while the lid is removed or replaced.

BRIEF DESCRIPTION OF THE DRAWINGS

FIGS. 4A–4B are partial, diagrammatic front views of the present invention.

DESCRIPTION OF THE PREFERRED EMBODIMENT

Figure 1:
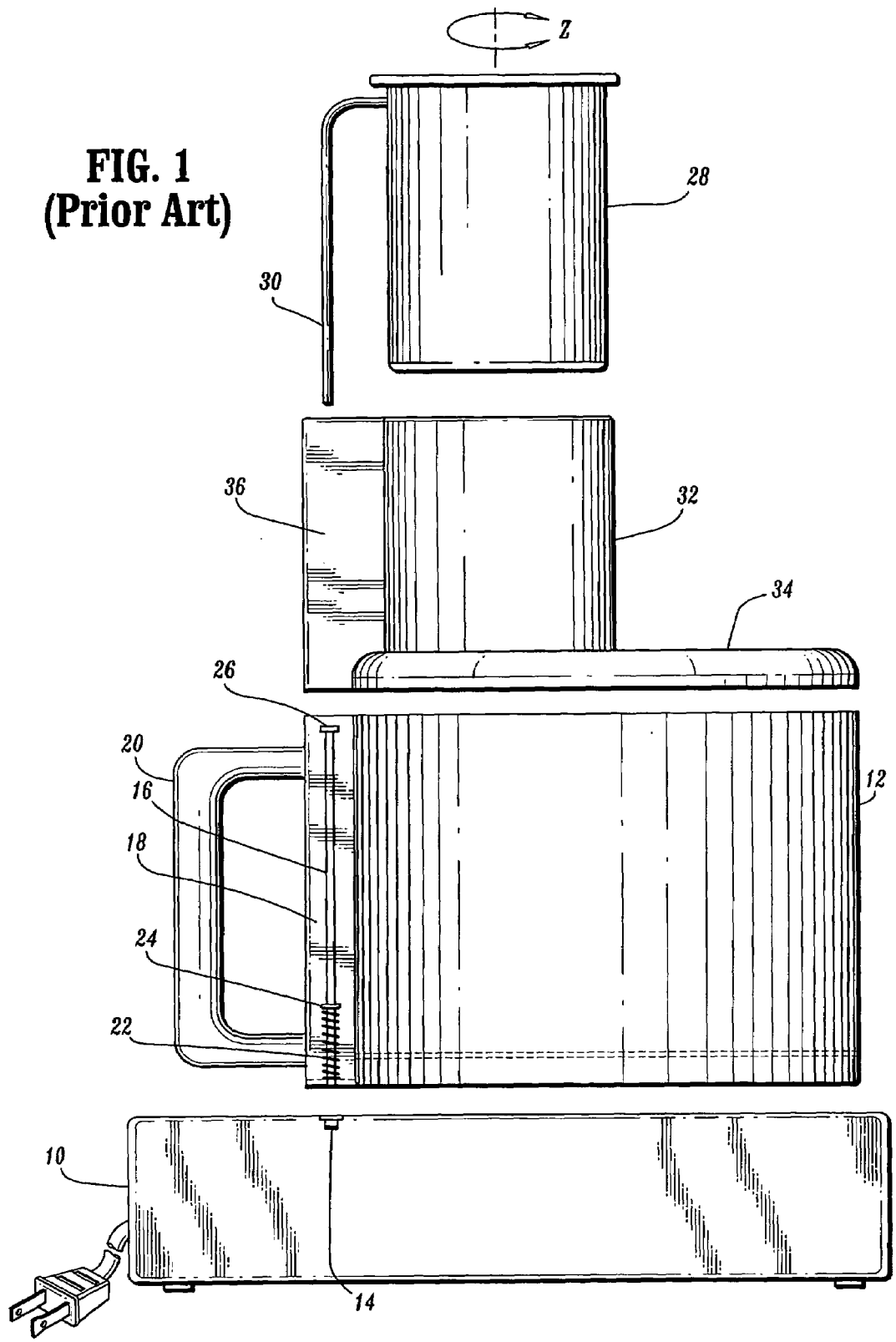
FIGS. 1–2 are diagrammatic illustrations in the exploded side, and side view, respectively, of a prior art appliance.
Figure 2:
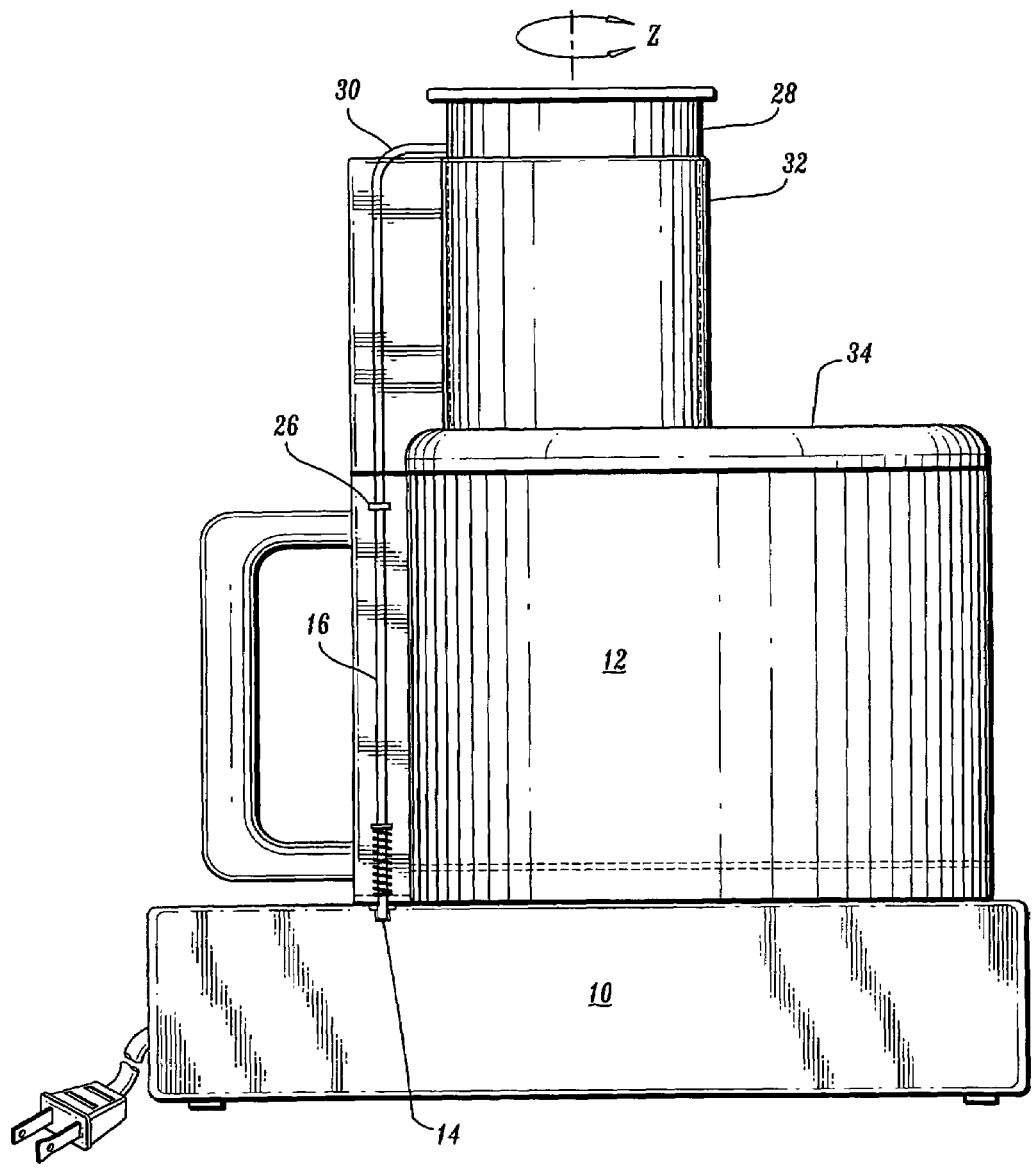
Figure 3:
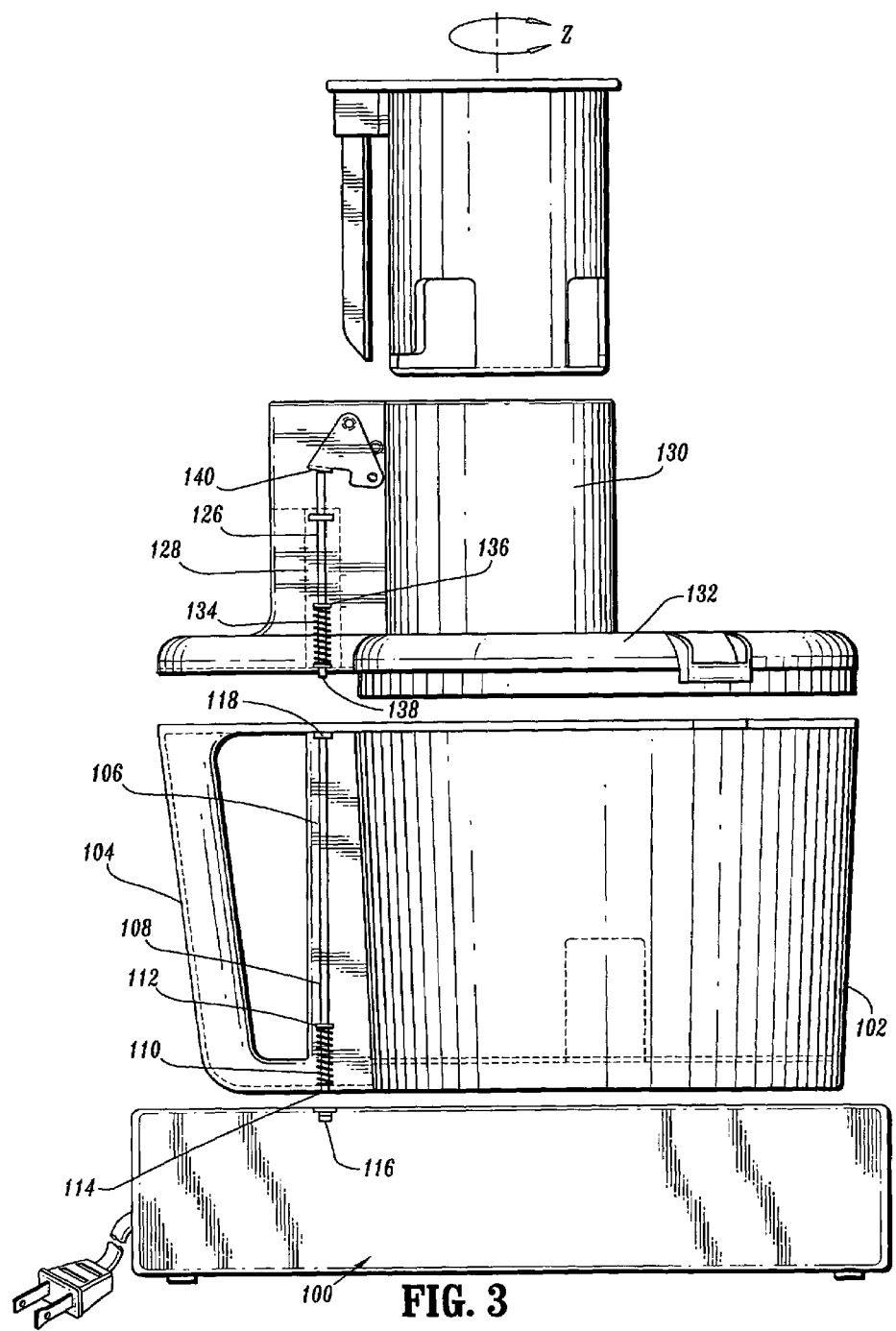
FIG. 3 is a diagrammatic side view of an appliance in accordance with a preferred embodiment of the present invention.

A schematic side view of the present invention is shown in FIG. 3. A base (100) houses an electric motor and drive assembly of the type generally known (not shown) for driving a food processor blade (not shown) housed in the cylindrically shaped bowl (102). The bowl (102) comprises a handle (104) and a vertical channel (106). Located in the vertical channel (106) is a linearly movable rod (108) that is mounted for vertical movement within the channel (106). The rod (108) is supported on a compression spring (110) that cooperates with a flange (112) on the rod (108). The tip (114) of the rod (108) extends through an opening in the channel (106) so that it may extend below the bowl (102) when the spring (110) is compressed. When the spring (110) is fully compressed, the rod tip (114) engages a switch (116) of the type generally known that enables or activates the electric motor and/or drive for the food processor blade. When the spring (110) is relaxed, the rod tip (114) is disengaged from the switch (116).

Referring to FIGS. 3, 4A and 4B, where FIGS. 4A and 4B are partial, schematic front views of the present invention, a pivoting arm (118) hinged at a pin (120) and having an upper contact surface (122) and a lower contact surface (124) is positioned above the first rod (108) so that the lower contact surface (124) is in contact with the top of the first rod (108).

A second rod (126) is mounted in a vertical channel (128) formed adjacent to a food chute (130) that is integral with the lid (132). The second rod (126) is mounted for vertical movement within the channel (128) and is supported by a compression spring (134) that engages a flange (136) on the rod (126). As shown in FIG. 4A, when the second rod (126) is resting and the compression spring (134) is relaxed, the tip (138) of the second rod (126) is positioned above the arm (118). As shown in FIG. 4B, when the compression spring (134) is compressed, the tip (138) extends downwardly. This causes the tip (138) to contact the switch (116) and activate the motor and/or drive of the chopping blade.

The second rod (126) is moved downwardly by a force applied by a contact member (140) of a pivoting mechanism (142) that comprises a hinge (144), a roller (146) supported by a pair of upper arms (148) connected to the hinge (144), and the contact member (140) which comprises two arm parts and a contact area that contacts the rod (126).

Figure 5:
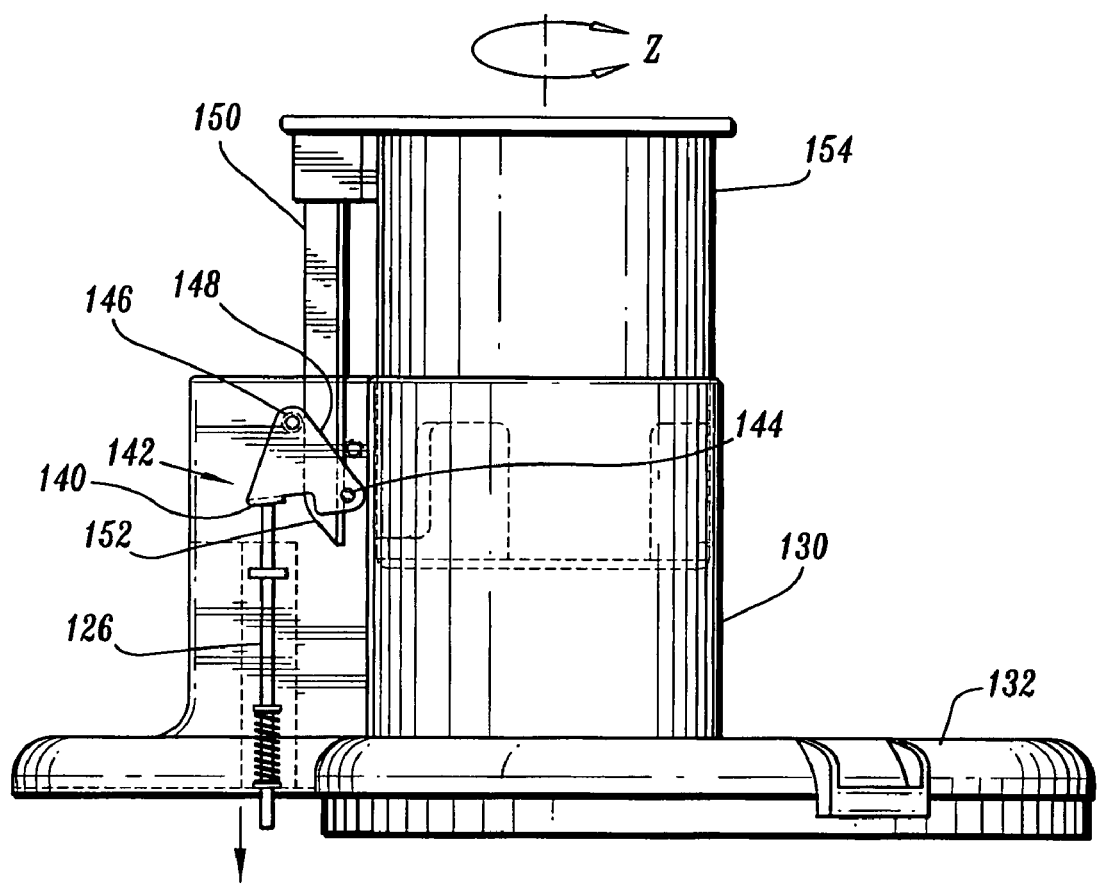
FIG. 5 is a partial, diagrammatic side view of the present invention.

The pivoting mechanism (142) is caused to pivot between the positions shown in FIGS. 4A–4B by force applied through an elongated beveled member (150) having an upper end attached to the plunger (154) and a lower end (152) that is beveled. In a condition where the lid (132) is secured in place, and the first rod (108) and the second rod (126) are vertically aligned, the plunger (154) is pushed into the food chute (130), the lower end (152) bevel engages the roller (146) and causes the pivoting mechanism (142) to pivot from the position of FIG. 4A to the position of FIG. 4B as a result of the roller (146) riding up the beveled section and onto the maximum width of the beveled member (150) as shown in FIG. 5.

Figure 6:
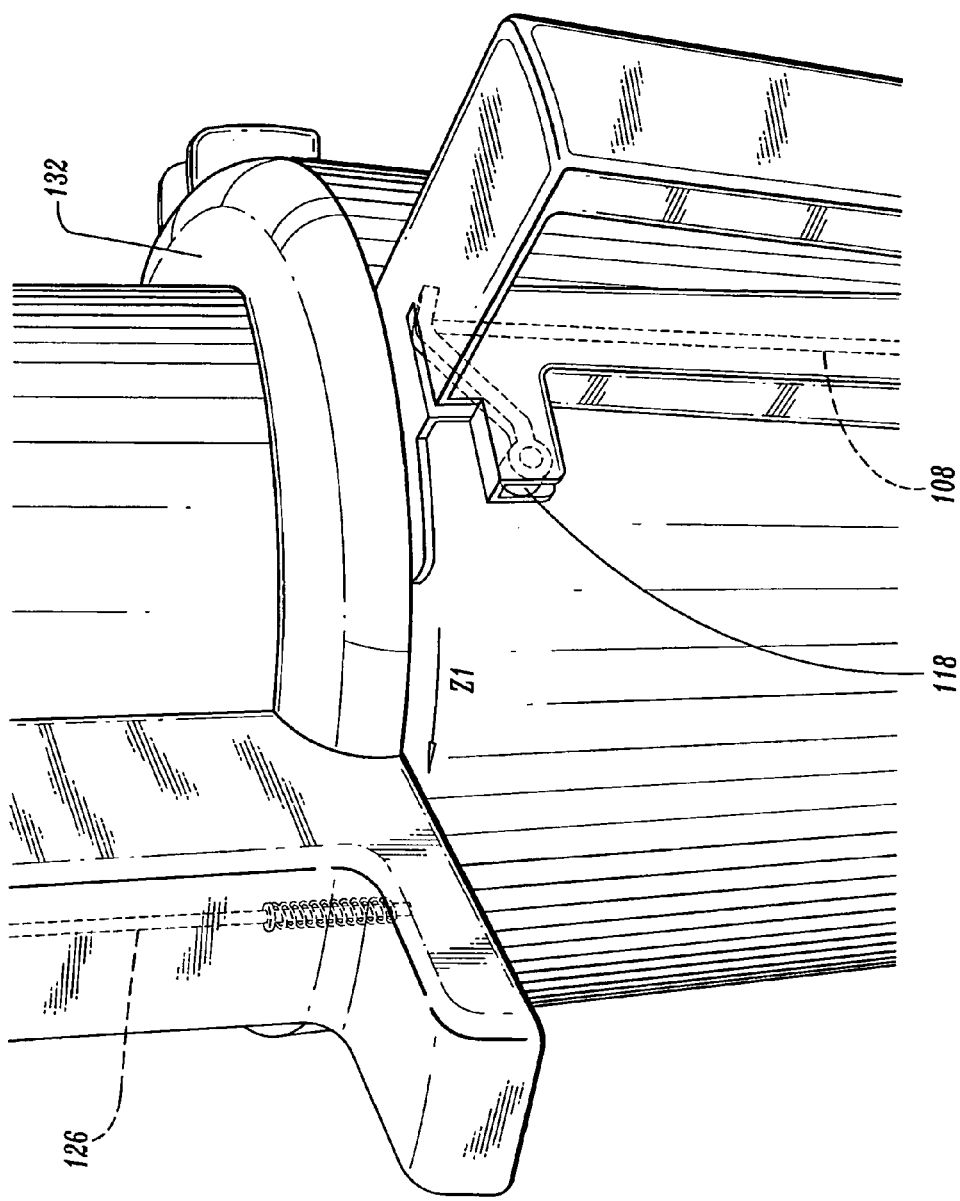
FIG. 6 is a partial, diagrammatic perspective view of the present invention.

In order to remove the lid (132) without first removing the plunger (154), the lid (132) is rotated relative to the bowl (102) in the direction Z1 as shown in FIG. 6. This movement causes the second rod (126) to move in from the condition of FIG. 4B to the condition of FIG. 6, thereby releasing the pivoting arm (118) so that it is free to pivot up as shown in FIG. 6 and in FIG. 4A under the force of the spring (110). This action disables the switch (116) be allowing the first rod (108) to move upward under the bias of the spring (110). In order to re-attach the lid (132) and re-activate the switch (116), the rotational movement of the lid (132) is reversed, opposite of Z1, so that the second rod (126) will ride against the pivoting arm (118) to cause the condition shown in FIG. 4B.

If desired, the plunger (154) may be removed from the chute (130) causing the first and second rods to release the switch under spring pressure.

Figure 7:
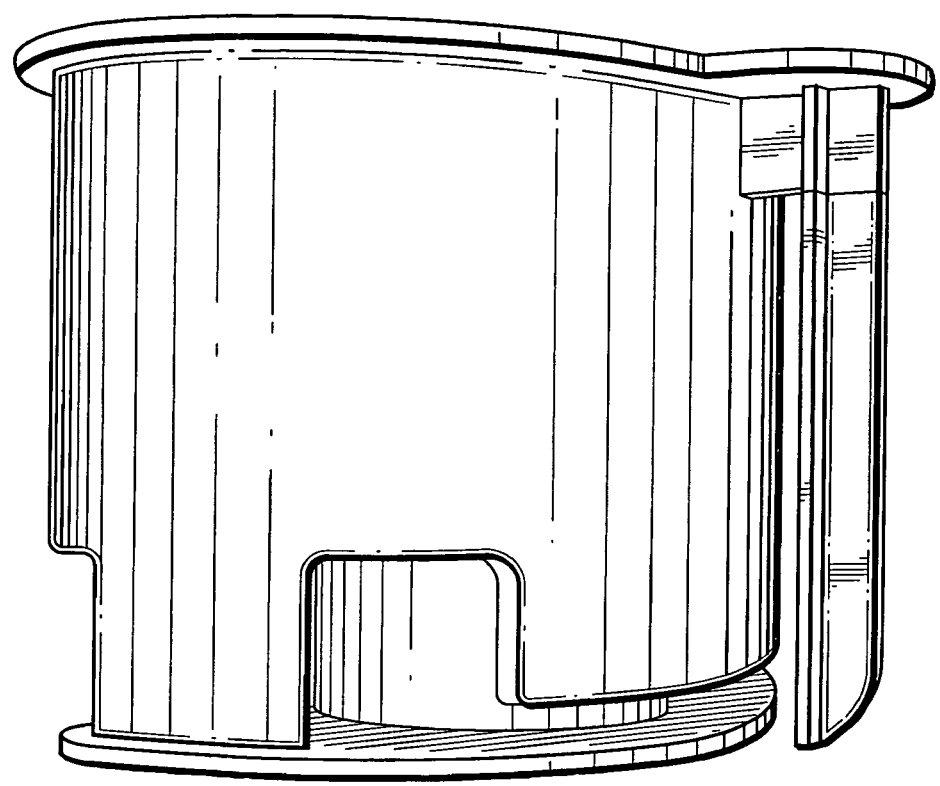
FIG. 7 is a side view of a component of the present invention.
Figure 8:
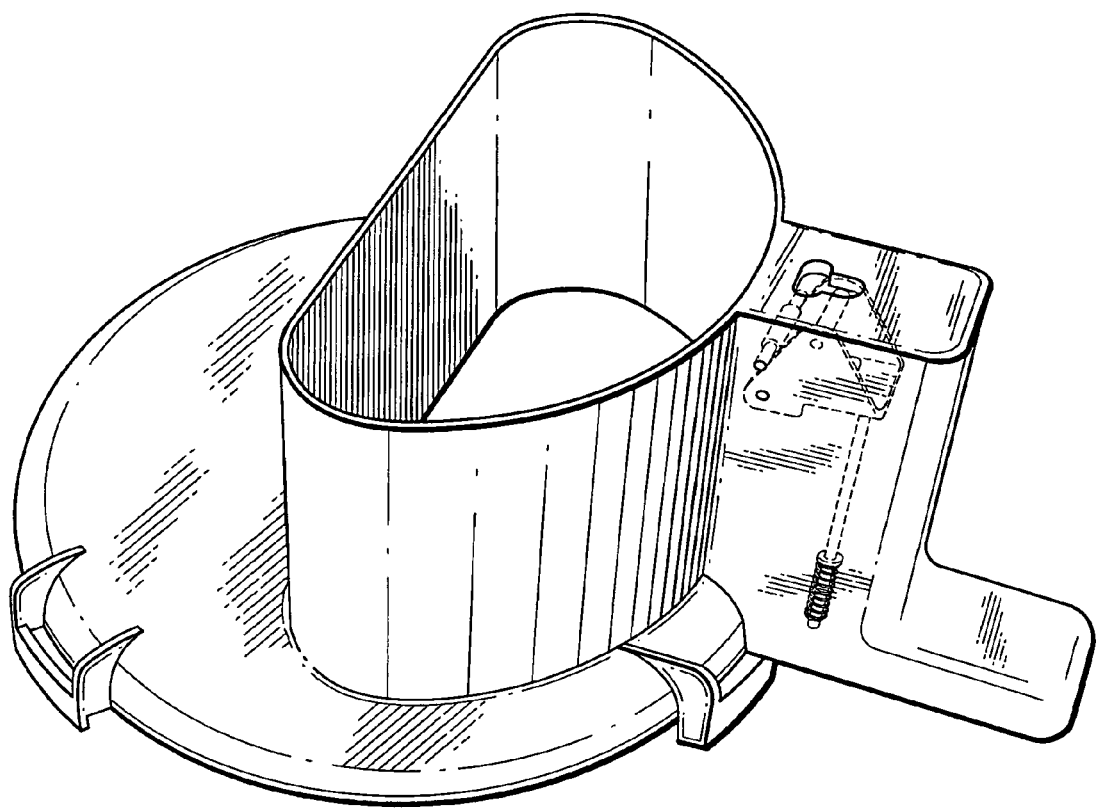
FIG. 8 is a perspective view of a component of the present invention.
Figure 9:
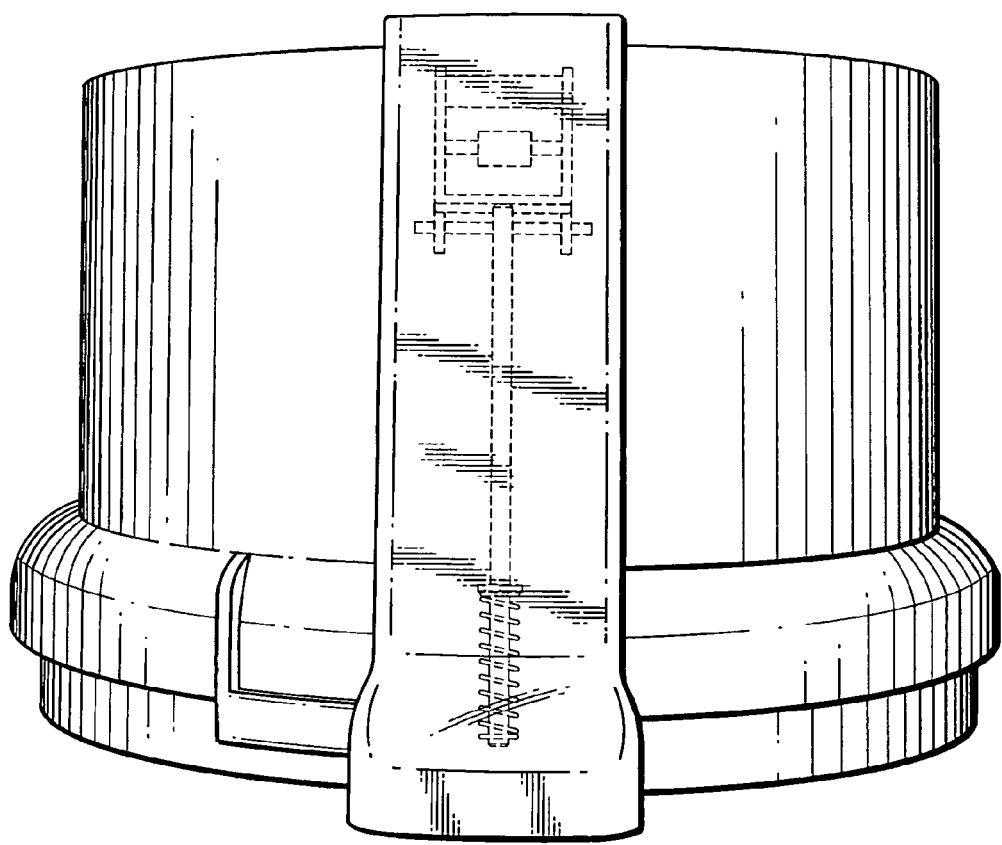
FIG. 9 is a front view of a component of the present invention.

FIG. 7 is an illustration of the plunger (154) and beveled member (150). FIGS. 8–9 are illustrations of the lid and chute (130), the second rod (126), and the pivoting mechanism (142).

It is understood that the present invention has applicability to other appliances and is not limited to food processors. While a preferred embodiment of the invention has been herein disclosed and described, it is understood that various modifications can be made without departing from the scope of the invention.

What is claimed is:

1. A food appliance comprising
   a base housing a motor and a drive shaft;
   a bowl adapted to mount on said base, said bowl having an opening therethrough allowing said drive shaft to be received in said bowl;
   a food processing implement adapted to be attached to and driven by said drive shaft while positioned in said bowl;
   a lid selectively attachable to and detachable from said bowl;
   a feed tube extending from said lid and adapted to receive food product therethrough for guiding said food product into said bowl;
   a plunger adapted to be selectively positioned into said feed tube and advanced therein, or to be selectively removed from said feed tube;
   a pivoting transmission member pivotally attached to said feed tube; and
   a switching assembly adapted to enable activation of said motor when said lid is in a predetermined position on said bowl and when said plunger is received at least partially into said feed tube such that said plunger causes said pivoting transmission member to pivot from a first position to a second position, and
   wherein said switching assembly further comprises an arm adjacent to where said lid is selectively attachable to said bowl, adapted to disable activation of said motor either when said plunger is removed at least partially from said feed tube or when said lid is moved away from said predetermined position regardless of the position of said plunger.

2. A food appliance according to claim 1, wherein said switching assembly comprises a transmission assembly for transmitting force generated by movement of said plunger to a switch, whereby said force is applied to said switch to enable activation of said motor.

3. A food appliance according to claim 2, wherein said transmission assembly comprises a first transmission member attached to said plunger and adapted to engage said pivoting transmission member which engages a second transmission member moveably attached to said lid, whereby movement of said plunger relative to said lid causes said first transmission member to impart movement on said pivoting transmission member and said second transmission member, which causes force to be applied to said switch to enable activation of said motor.

4. A food appliance according to claim 3, wherein said transmission assembly further comprises a third transmission member moveably attached to said bowl, whereby movement of said second transmission member imparts movement on said third transmission member, which causes force to be applied to said switch to enable activation of said motor.

5. A food appliance according to claim 4, where in said third transmission member comprises a distal end tip adapted to press said switch when said third transmission member is moved in response to movement of said plunger.

6. A food appliance according to claim 3, wherein said first transmission member comprises at least one elongated rib member.

7. A food appliance according to claim 3, wherein said second transmission member comprises a spring-biased component that is selectively moveable between a position in which it enables activation of said motor and a position in which it disables activation of said motor.

8. A food appliance according to claim 7, wherein said transmission assembly further comprises a third transmission member moveably attached to said bowl, whereby movement of said second transmission member imparts movement on said third transmission member, which causes force to be applied to said switch to enable activation of said motor.

* * * * *